United States Patent [19]

Goertz et al.

[11] Patent Number: 4,822,137

[45] Date of Patent: Apr. 18, 1989

[54] MEANS FOR ADJUSTING THE FOCAL LENGTH OF A LENS IN RELATION TO ITS DISPLACEMENT

[75] Inventors: Jozef L. L. Goertz, Belfeld; Bernardus W. de Jong, Venlo, both of Netherlands

[73] Assignee: Oce-Nederland B.V., Venlo, Netherlands

[21] Appl. No.: 133,747

[22] Filed: Dec. 16, 1987

[30] Foreign Application Priority Data

Dec. 22, 1986 [NL] Netherlands ........................ 8603254

[51] Int. Cl.[4] ................................................ G02B 7/02

[52] U.S. Cl. ............................... 350/255; 354/195.11; 355/56

[58] Field of Search ....................... 350/255, 256, 257; 354/195.11; 355/56, 58; 101/137, 148, 175, 234

[56] References Cited

U.S. PATENT DOCUMENTS

| | | | |
|---|---|---|---|
| 2,464,559 | 3/1949 | Davenport et al. | 354/195.11 |
| 4,135,798 | 1/1979 | Slavitter | 350/255 |
| 4,448,517 | 5/1984 | Hayashi | 355/56 |
| 4,641,957 | 2/1987 | Takeda et al. | 355/58 |

*Primary Examiner*—John K. Corbin
*Assistant Examiner*—Loha Ben
*Attorney, Agent, or Firm*—Reed Smith Shaw & McClay

[57] ABSTRACT

A copying machine provided with an optical system having a variable imaging ratio and a fixed distance between the image plane and the object plane and a lens whose focal length can be adjusted to the selected imaging ratio by rotation of a toothed ring coupled to the lens. Displacement of the lens with respect to the object plane and the image plane, in order to change the imaging ratio, is converted into a rotation of the toothed ring on the lens by means of a system of cooperating gearwheels. One of these gearwheels has at least one toothed ring segment which is pivotable about an axis; situated almost at the circumference of the gearwheel and extending axially of said gearwheel. The toothed ring segment can be caused to pivot about the axis and be fixed in any position.

4 Claims, 4 Drawing Sheets

MEANS FOR ADJUSTING THE FOCAL LENGTH OF A LENS IN RELATION TO ITS DISPLACEMENT

FIELD OF THE INVENTION

The present invention relates to copying machines having a variable imaging ratio and fixed distance between the image plane and the object plane and, in particular, to a means for adjusting the focal length in relation to the displacement of the lens when changing the imaging ratio.

BACKGROUND OF THE INVENTION

It is well known to provide copier devices with variable imaging ratio lens mechanism to prôvide for image enlargement and reduction. Also devices are well known for changing the focal length of lenses both in photographic as well as copying machines. For example, in U.S. Pat. No. 4,107,714 a means is described for changing the focal length of the lens based on the movement of the lens itself.

In that device, the focal length is changed by means of a toothed ring on the lens which is driven by a rack and pinion mechanism. The rack is held in contact with a guide bar by spring pressure so that on movement of the lens the rack performs a translatory movement depending upon the profile of the guide bar. The translatory movement of the rack is then converted by means of the pinion into a rotation of the toothed ring on the lens. This provides a fixed transmission ratio in the system for changing the focal length, so that there is a rectilinear relationship between the lens movement and the focal length change.

However, when systems of this type are mass produced problems often arise which do not permit the lens to obtain optimum sharpness. Normally, these problems are a result of tolerances in the system components, even within the permitted tolerance limits. Accordingly, it is the object of the present invention to provide a copying machine which offers the facility of respectively so adjusting and correcting the rectilinear relationship between the lens movement and the change of the focal length, within a reasonable tolerance range, that a sharp image can always be obtained in the image plane.

SUMMARY OF THE INVENTION

Generally, the present invention provides that one of the cooperating gearwheels of the copier's optical system has at least one toothed ring segment which is pivotable about an axis that extends axially of said gearwheel and is situated substantially near the circumference of the gearwheel. Also, means are provided to cause the toothed ring segment to pivot about the axis and to enable it to be fixed to any position. Preferably, the axis about which the toothed ring segment is pivotable is formed by an integrated hinge.

In a preferred embodiment the means for causing the toothed ring segment to pivot consist of one or more setscrews which are disposed in the gearwheel itself and act on the free end of the toothed ring segment to cause the toothed ring segment to pivot.

In another embodiment of the invention, the means for causing the toothed ring segment to pivot consist of a cam disc which is mounted laterally of the toothed ring segment on the rotation shaft of the gearwheel. A cam follower cooperating therewith is mounted at the side edge of the toothed ring segment at a distance from the axis about which the toothed ring segment can pivot.

The present invention provides a means for maintaining image sharpness throughout the imaging range. The adjustment means is capable of being manufactured so as to provide image sharpness with normal design tolerances. Other advantages of the invention will become apparent from a perusal of the following description of the presently preferred embodiments taken in connection with the accompanying drawings.

PRESENTLY PREFERRED EMBODIMENT

In a copying machine's exposure system in which there is a fixed distance between the image plane and the object plane, the imaging ratio is varied by moving the lens along the optical axis. In these conditions the focal length of the lens has to be adjusted in order to create a sharp image in the image plane. The relationship between the movement of the lens and the resulting necessary adjustment of the focal length is a rectilinear relationship known from elementary optical laws. This rectilinear relationship is represented diagrammatically in FIG. 1.

Figure 1:
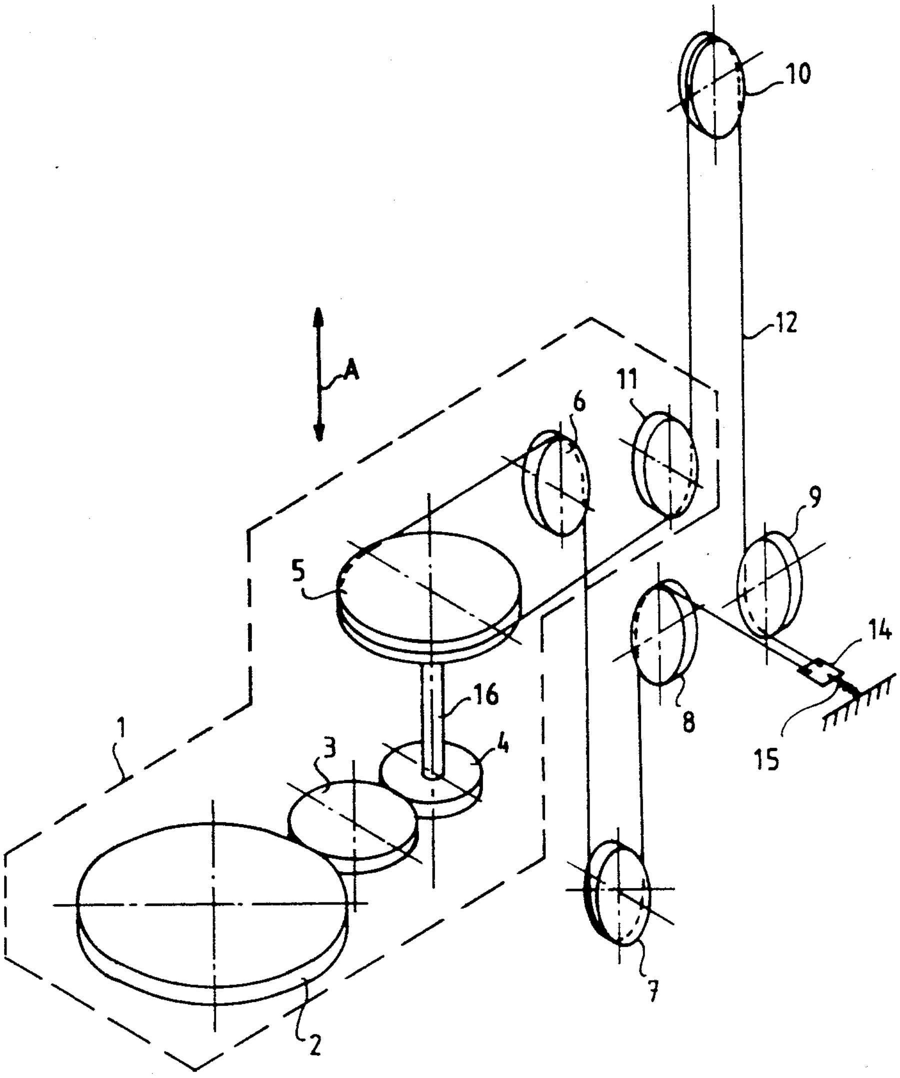
FIG. 1 is a diagrammatical representation of the mechanism for changing the focal length of a lens.

Referring to FIG. 1, carriage 1 for mounting the copier's lens is adapted for movement and can be moved in the directions of double arrow A by a drive means (not shown) but known in the art. A toothed ring 2 is rigidly connected to the copier's lens in order to vary the focal length by rotation. The rotation of toothed ring 2 and, hence, the accompanying change in the focal length is obtained by means of gearwheels 3 and 4, respectively, and pulleys 5 through 11 over which cord 12 is entrained. The gearwheels 3 and 4 and pulleys 5, 6 and 11 are mounted to be freely rotatable on carriage 1. Pulleys 7, 8, 9 and 10 are mounted to be freely rotatable in the optical system housing of the copier, which is not shown further in this drawing.

As shown in FIG. 1, cord 12 is entrained about pulleys 5 through 11, and its ends are connected to the optical system housing by means of coupling 14 and spring 15. Movement of the carriage 1, for example in the upward direction with reference to FIG. 1, results in a movement of the middle part of cord 12, which is rigidly connected to the pulley 5, over the pulleys 11, 5 and 6 so that the latter rotate through a given angle. An angular rotation of the pulley 5 is converted into an angular rotation of the gearwheel 4 via spindle 16 to which both the pulley 5 and the gearwheel 4 are rigidly connected. By means of intermediate gearwheel 3, this angular rotation finally results in a rotation of the toothed ring 2 and, hence, in an adjustment of the focal length. Only part of the circumference of gearwheel 3 is ever required for the complete range of the focal length variation.

It will be apparent that suitable choice of the parameters of the transmission (the diameters of the pulleys and gearwheels, the number of teeth, the pitch of the gearwheels, and so on) enables the required relationship to be obtained between the movement of the lens and the adjustment of the focal length. However, with the selected transmission, this relationship is fixed and cannot be adjusted arbitrarily in the configuration shown. This is a disadvantage particularly if tolerances in the system prevent the selected transmission from giving the correct result or continuing to provide a correct focal length over the entire image range, i.e.. a sharp image in any position of the lens. In the invention, the relationship between the movement of the lens and the adjustment of the focal lengths is adjusted by use of a special construction of transmission gearwheel 3 in accordance with one of the embodiments of the invention.

Instead of a solid gearwheel, gearwheel 3 of the invention is constructed from a core having one or more toothed ring segments disposed therearound, these segments are pivotable inwardly and outwardly about an axis at the circumference of the gearwheel. In this way, the transmission can be varied in such a manner that the projected image is maintained in sharp focus for any position of the lens. A number of preferred embodiments of intermediate gearwheel 3 and preferred means for pivoting the toothed ring segments is described with reference to FIGS. 2 through 7.

Figure 2:
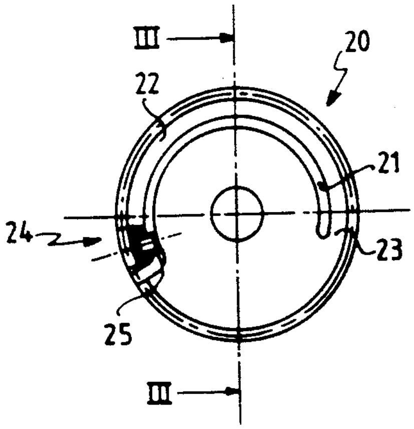
FIG. 2 is an elevation of a gearwheel of the kind that can be used in a copying machine according to the invention.
Figure 3:
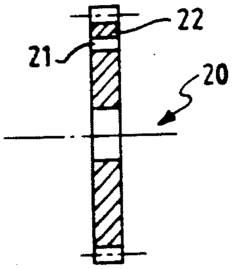
FIG. 3 is a cross-sectional view taken along line III-'III of FIG. 2.

Referring to FIGS. 2 and 3, a first embodiment is shown in which intermediate gearwheel consists of gearwheel 20 formed with slot 21 over part of the circumference. The result is a toothed ring segment 22 which is pivotally connected to the rest of gearwheel 20 only at connecting zone 23. Connecting zone 23 thus acts here as an integrated hinge about which toothed ring segment 22 can pivot. To allow this pivoting of toothed ring segment 22 a setscrew 25 is disposed near free end 24 of toothed ring segment 22, with which the distance between free end 24 and gearwheel 20 can be adjusted. The resilient spring tension of the toothed ring segment 22 ensures that free end 24 is always prestressed in the direction of the core of the gearwheel 20.

Figure 4:
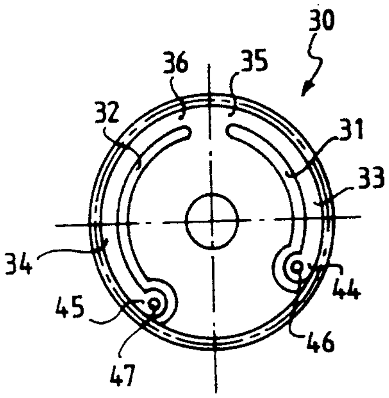
FIG. 4 is an elevation of another embodiment of a gearwheel of the kind that can be used in a copying machine according to the invention.

FIG. 4 illustrates another embodiment of an intermediate gearwheel which gearwheel 30 is formed with two slots 31 and 32 so that two toothed ring segments 33 and 34, respectively, are formed. Here again the segments 33 and 34 are connected to the rest of the gearwheel 30 only at connecting zones 35 and 36, respectively. These connecting zones function as integrated hinges. However, in the embodiments described hereinbefore, it is also possible to construct the toothed ring segments 22, 33, 34 as loose components and to mount each one to be freely rotatable about an axis at the place of connecting zones 23 or 35, and 36, in associated gearwheel 20 or 30.

Figure 5:
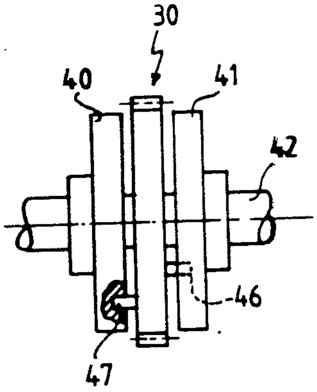
FIG. 5 represents an assembly of the gearwheel of FIG. 4 and the cam discs cooperating therewith for causing the toothed ring segments used in a copying machine according to the invention to pivot.

The construction for the pivoting of toothed ring segments 33, 34 is explained with reference to FIGS. 5, 6 and 7. FIG. 5 represents a complete construction consisting of gearwheel 30 and two cam discs 40 and 41 which are mounted to be freely rotatable on either side of gearwheel 30 on common axis of rotation 42.

Figure 6:
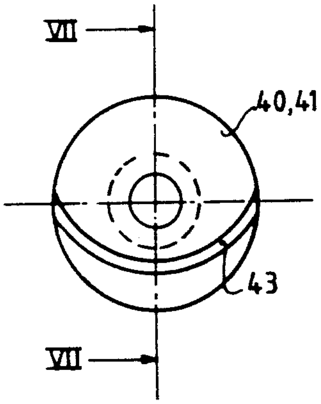
FIG. 6 is an elevation of a cam disc for causing a toothed ring segment used in a copying machine according to the invention to pivot.
Figure 7:
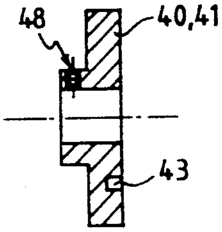
FIG. 7 is a cross-sectional view taken along line VII—VII of FIG. 6.

The construction of cam discs 40 and 41 is illustrated in FIGS. 6 and 7. As shown, cam discs 40 and 41 are completely identical, but mirror-images of one another. Cam discs 40 and 41 are each formed with a slot 43 which cooperates with cam followers 46 and 47, respectively, fixed in free ends 44 and 45 of the toothed ring segments 33 and 34, respectively. Rotation of cam discs 40 and 41 with respect to gearwheel 30 results in a pivoting movement of toothed ring segments 33 and 34 because cam followers 46 and 47 are forced to follow the shape of associated slot 43. Of course, the place and the configuration of the slot 43 can be adapted depending on the required configuration of the adjustment of the focal length.

Cam discs 40 and 41 can then be fixed onto rotation shaft 42 in the required position of the toothed ring segments, for example by means of a setscrew which is tightened against the shaft through a taped hole 48 in the cam disc. Those skilled in the art can see that a number of parts in the embodiments described hereinbefore are mutually interchangeable. For example, in the embodiments shown with respect to FIGS. 2 and 3, the single toothed ring segment can be replaced by a double toothed ring segment as shown with respect to FIG. 4, while the construction for pivoting a toothed ring segment as shown in FIGS. 4 to 7 can be used, and vice versa.

Figure 8:
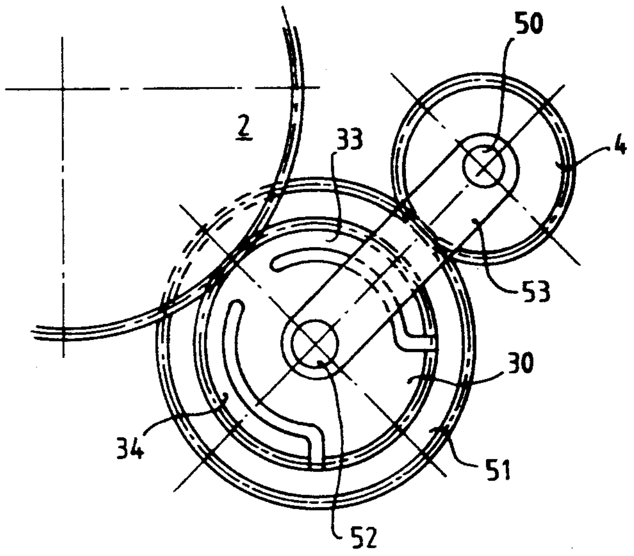
FIG. 8 represents part of the mechanism of FIG. 1 using a gearwheel shown in FIG. 4.

Finally, FIG. 8 illustrates a preferred method for incorporating adjustable intermediate gearwheel 30 in the transmission between gearwheel 4 and toothed ring 2 of the lens. This represents, with reference to the embodiment of FIG. 4, what adjustment is required to the arrangement of the gearwheels in the transmission to enable the toothed ring segments to pivot inwardly and outwardly. Of course, it is possible to use the embodiment of the adjustable intermediate gearwheel according to FIG. 2 in the transmission.

As shown in FIG. 8, gearwheel 4 is mounted so as to be freely rotatable on shaft 50, while gearwheels 30 and 51 are fixed to shaft 52. Shaft 52 is, in turn, mounted to the end of arm 53 which is rotatable about shaft 50 and, for example, is biased in the direction of toothed ring 2 by a spring (not shown). Gearwheels 30 and 51 are positioned on shaft 52 such that gearwheel 30 engages toothed ring 2 and gearwheel 51 engages gearwheel 4.

If toothed ring segments 33 and 34 are pivoted outwards, for example, by their actuating mechanism, then the radius of gearwheel 30 increased on its rotation so that arm 53 moves outwardly. Since the radius of gearwheel 30 increases, a different transmission ratio is obtained; thus, a larger adjustment of the focal length is obtained than in the middle position of the toothed ring segments 33 and 34. In these conditions gearwheel 51 rolls over gearwheel 4, the engagement of all the gearwheels being maintained. The position of the adjustable gearwheel 30 represented in FIG. 8 corresponds to the position of the lens in the optical system for a 1:1 imaging ratio. Thus rotation of gearwheel 30 to the left or to the right corresponds to an enlargement or reduction in the optical system.

It is evident, therefore, that different adjustments of the toothed ring segments enable a different configuration of the adjustment of the focal length to be selected for enlargement and reduction. The toothed ring segments can be adjusted independently of one another, so that any faults found in sharpness over the complete range of the imaging ratio can be corrected.

While presently preferred embodiments of the invention have been shown and described in particularity, the invention may be otherwise embodied within the scope of the appended claims.

What is claimed is:

1. In a copying machine having:

an optical system with a variable imaging ratio and a fixed distance between the image plane and the object plane;

a lens mounted upon a moveable carriage, the focal length of which can be adjusted to a selected imaging ratio by rotation of a toothed ring coupled thereto;

a drive means for displacing the carriage; and a system comprising at least two cooperating gear wheels for converting the displacement of the carriage into a rotation of said toothed ring thereon, the improvement in combination therewith comprising:

at least one toothed ring segment on one cooperating gearwheel substantially near the circumference of said gearwheel, said segment being pivotable about an axis which extends axially of said gear wheel, and pivot means for causing said toothed ring segment to pivot about said axis and enable it to be fixed in any position.

2. The improvement set forth in claim 1, wherein said axis about which said toothed ring segment is pivotable is formed by an integrated hinge.

3. The improvement set forth in claims 1 or 2, wherein said pivot means for causing said toothed ring segment to pivot consist of at least one setscrew which is disposed in the gearwheel whereby said setscrew acts on the free end of the toothed ring segment to cause said toothed ring segment to pivot.

4. The improvement set forth in claim 1 or 2, wherein said pivot means for causing said toothed ring segment to pivot consist of a cam disc mounted laterally of said toothed ring segment on the shaft of the gearwheel, and a cam follower cooperating therewith mounted at the side edge of the toothed ring segment at a distance from the axis about which the toothed ring segment can pivot.

* * * * *